US012753900B2

(12) United States Patent
Zils

(10) Patent No.: US 12,753,900 B2
(45) Date of Patent: Oct. 6, 2026

(54) SIGNAL LIGHT HAVING A U-SHAPED OR C-SHAPED HOUSING FOR A CONSTRUCTION MACHINE OR WORKING MACHINE

(71) Applicant: MOBA Mobile Automation AG, Limburg (DE)

(72) Inventor: Boris Zils, Limburg (DE)

(73) Assignee: MOBA Mobile Automation AG, Limburg (DE)

( * ) Notice: Subject to any disclaimer, the term of this patent is extended or adjusted under 35 U.S.C. 154(b) by 0 days.

(21) Appl. No.: 19/079,244

(22) Filed: Mar. 13, 2025

(65) Prior Publication Data

US 2025/0297722 A1 Sep. 25, 2025

(30) Foreign Application Priority Data

Mar. 21, 2024 (DE) ........................ 102024202679.4

(51) Int. Cl.

*F21V 21/088* (2006.01)
*F21S 43/00* (2018.01)
*F21W 103/00* (2018.01)

(52) U.S. Cl.

CPC .......... *F21S 43/601* (2024.05); *F21V 21/088* (2013.01); *F21V 21/0885* (2013.01); *F21W 2103/00* (2018.01)

(58) Field of Classification Search

CPC . B60Q 2800/02; B60Q 1/2696; F21V 21/088; F21V 21/0885; F21V 15/012; F21W 2107/00

USPC .......................................................... 362/546

See application file for complete search history.

(56) References Cited

U.S. PATENT DOCUMENTS

| | | | | |
|---|---|---|---|---|
| 10,344,924 | B1 * | 7/2019 | Ganahl | F21V 15/04 |
| 2009/0279299 | A1 | 11/2009 | Yang | |
| 2011/0058360 | A1 * | 3/2011 | Taiga | F21L 4/02 362/382 |
| 2017/0282784 | A1 | 10/2017 | Foster et al. | |
| 2021/0183185 | A1 | 6/2021 | Vaidya et al. | |
| 2022/0252243 | A1 * | 8/2022 | Ubhayakar | H02J 7/0044 |
| 2023/0036850 | A1 | 2/2023 | Olsen et al. | |

FOREIGN PATENT DOCUMENTS

| | | | |
|---|---|---|---|
| DE | 10212895 | A1 | 10/2003 |
| DE | 102010040310 | A1 | 11/2011 |
| DE | 112019004337 | T5 | 7/2021 |
| EP | 3061650 | A1 | 8/2016 |
| JP | 2005142060 | A | 6/2005 |
| JP | 2006137228 | A | 6/2006 |

* cited by examiner

*Primary Examiner* — Robert J May

(74) *Attorney, Agent, or Firm* — Ashurst Perkins Coie US LLP; Michael A. Glenn

(57) ABSTRACT

Signal light, in particular a signal light for a construction machine, working machine, agricultural machine, or a vehicle, comprising: a housing; at least one lighting element integrated into the housing and configured to visualize a state; wherein the housing has a C-shape or U-shape and an undercut is formed by the C-shape, wherein the housing is flexible in certain regions.

18 Claims, 3 Drawing Sheets

SIGNAL LIGHT HAVING A U-SHAPED OR C-SHAPED HOUSING FOR A CONSTRUCTION MACHINE OR WORKING MACHINE

CROSS-REFERENCE TO RELATED APPLICATION

This application claims priority from German Patent Application No. DE 10 2024 202 679.4, which was filed on Mar. 21, 2024, and is incorporated herein in its entirety by reference.

Embodiments of the present invention relate to a signal light, in particular to a signal light for a construction machine, working machine, agricultural machine, or a vehicle.

BACKGROUND OF THE INVENTION

Signal lights or status lights are used to indicate various machine states, such as ready for operation, malfunction, or warning. Various colors can be used for this purpose, for example. Color and signal types for such displays are known from DE 10212895 A1, for example. A signal column having a plurality of signal elements and various colors is disclosed here, for example. Fastening such signal lights is problematic, especially when it comes to mounting such signal lights on different machines.

Driving of signal lights or status lights via a bus is disclosed in DE 112019004337 T5, for example. The sensor status indicator assembly disclosed here includes a detection interface which is configured to be communicatively coupled to a wiring harness of a sensor.

SUMMARY

An embodiment may have a signal light, in particular a signal light for a construction machine, working machine, agricultural machine, or a vehicle, comprising: a housing; at least one lighting element integrated into the housing and configured to visualize a state; wherein the housing comprises a C-shape or U-shape and is flexible in certain regions.

Another embodiment may have a construction machine, working machine, agricultural machine, or vehicle comprising a signal light according to the invention Another embodiment may have a system comprising a signal light according to the invention as well as a pipe or frame or holder with a specified cross section.

Embodiments of the present invention provide a signal light, in particular a signal light for a construction machine, a working machine, an agricultural machine, or a vehicle, having a housing and at least one lighting element which is integrated into the housing and is configured to visualize a state. For example, this can be a red, yellow, green, or white lighting element, such as an LED. The housing has a C-shape or alternatively a U-shape and is flexible in certain regions.

According to embodiments, the housing is configured to be elastically deformed with respect to an opening cross section, defined by the ends or housing halves of the C-shape or the U-shape, due to the region-wise flexible property of the housing.

Embodiments of the present invention are based on the knowledge that a signal light can be configured in a C-shape and a U-shape and, as soon as a certain degree of flexibility is installed in the housing, this C-shape and U-shape can be used for clamping. It is thus advantageously possible to clamp the signal light to a pipe or a frame of a construction machine, working machine, agricultural machine, or a vehicle. This allows flexible use.

According to embodiments, the signal light may comprise a data bus (e.g. CAN) and/or a data bus interface via which it may be coupled by means of a controller or a construction machine, working machine, agricultural machine, or a vehicle or a component of the machine/the vehicle, such as a working device or an attachment. For example, a CAN-open protocol which allows rapid integration, simple adaptation of baud rate and node ID may be used. A further advantage results from the U-shape or C-shape, namely such that emission of the light signal is possible in a large emission angle range. According to embodiments, the at least one integrated lighting element is thus configured to cover or to emit in an emission angle >120°, >150°, >180°, or even >270°. Furthermore, the unit may comprise a controller for decoding the data bus signals and for corresponding (individual) driving of the lighting elements.

According to further embodiments, the signal light comprises an electrical energy supply, in particular a battery or rechargeable battery integrated in the signal light or arranged thereon. These two measures further increase the flexibility and the universal use, since the signal light may be easily installed and then also operated autonomously, without additional cabling effort.

According to embodiments, the housing has a C-shape or U-shape in the first and second dimensions. Furthermore, the housing has an elongated shape in the third dimension. In other words, in the three-dimensional view, the housing with the C-shape or U-shape may have a cylindrical shape. Such a housing is robust and may also be provided with corresponding splash protection (e.g. IP67).

According to embodiments, a semicircular cross-sectional opening or generally a specified opening cross section is formed in the cylindrical shape or generally by the C-shape or the U-shape. The semicircular opening cross section or the specified opening cross section is configured to cause clamping with respect to a counterpart, e.g. with respect to a pipe. Furthermore, a frictional connection or non-positive connection may also be formed with the counterpart. The force for the non-positive connection or for the frictional connection and also for the clamping is advantageously achieved by the elastic property in the case of elastic deformation.

With regard to the integrated lighting element, it should be noted that, according to embodiments, the latter may have various colors and/or display frequencies in order to display various states. For example, a red light may be emitted as an alarm signal, wherein it would be conceivable to differentiate the priorities depending on the flashing or a static illumination.

According to embodiments, the integrated lighting element is configured as a running light or as a matrix for displaying texts, images or the like. By individually driving a plurality of lighting elements, the running light allows a waiting state to be indicated, for example. By means of the matrix, for example an LED matrix, the signal light may be adapted to customer requirements, e.g. in order to display or show customer-specific logos, images and/or texts. Furthermore, the lighting elements may be used for displaying fill levels or individual messages, for example.

According to embodiments, a brightness sensor is arranged in or on the signal light in order to automatically adapt the brightness of the integrated lighting element or of the running light or of the matrix to the ambient brightness.

This improves the readability of the lighting elements under changing light conditions. Furthermore, the power consumption of the signal light may also be optimized, e.g., if the brightness of the lighting elements is increased or reduced depending on the ambient brightness.

According to embodiments, a temperature sensor or temperature probe is arranged in or on the signal light in order to detect an ambient temperature or an internal temperature in the housing of the signal light. For example, the brightness of the integrated lighting element or of the running light or of the matrix may be automatically adapted depending on the measured temperature. For example, if the signal light is operated on a very warm day, the temperature in the interior of the signal light may increase significantly and the electronic components located therein, such as lighting elements, LED matrix, etc., could be damaged. In order to avoid this, the brightness of the lighting elements, LED matrix, etc., for example, may be reduced with increasing temperature and the resulting heat loss may thus be limited.

According to embodiments, an inclination sensor or position sensor is arranged in or on the signal light in order to determine the arrangement of the signal light on the construction machine/working machine/agricultural machine or the vehicle in a horizontal or vertical position. Furthermore, a change in position or orientation of the signal light may be detected with the inclination sensor or position sensor. If the signal light comprises a matrix for displaying logos, images or texts, it is possible, e.g., with a rotation of the signal light by 90°, to automatically adapt the displayed content (e.g., an image or a text) to the new position/orientation. The inclination sensor or position sensor may measure absolute values or relative values, i.e. changes such as rotational movements, etc., and, e.g, is an inclination sensor or inclination switch, an acceleration sensor, a gyroscope, a rotation rate sensor, or the like.

All measured or detected sensor values of the brightness sensor, of the temperature sensor, and/or of the inclination sensor or position sensor, as well as further information, such as the indication whether, and if so, by how much, the brightness of the lighting elements, LED matrix, etc. has been reduced, may also be transmitted to the controller or a display (e.g. an operating terminal) of the machine/the vehicle via the data bus or the data bus interface of the signal light.

According to a further embodiment, the signal light may also be supported by an integrated buzzer that acoustically indicates a current state or a change in state.

A further embodiment provides a construction machine, such as a working machine, agricultural machine, etc., or a vehicle, comprising a corresponding signal light. According to an embodiment, the construction machine/working machine/agricultural machine or the vehicle may comprise a pipe or a frame or a holder whose cross section substantially corresponds to an opening cross section of the C-shaped or U-shaped housing of the signal light.

By informative coupling of the construction machine/working machine/agricultural machine or the vehicle or the controller of the machine/the vehicle to the signal light, it is possible for one or more states of the construction machine/working machine/agricultural machine or the vehicle or a component arranged on the machine/the vehicle, such as a working device or an attachment, to be displayed by means of the signal light. For example, the component arranged on the machine/the vehicle may be a work basket, a (telescopic) boom, a rotary ladder, a (extendible) support, or a paving screed of a road paver, a material bunker, a bucket, a gripper, a coulter, a blade, an agricultural or forestry attachment for soil work, or the like. In this context, all known working devices or attachments of construction machines, working machines or agricultural machines, as well as vehicles, are conceivable. For example, fill levels, distances, measured values such as pressure, weight, or temperature values, limit values, sensor data, parameter data of the machine or the component, direction information (e.g. in the case of machine parts to be retracted and extended or lifted), or the like, or, generally, a current or present state (status) of the machine, the vehicle, or the component, or a change in values or states of any kind, may be displayed by means of the signal light. For example, the machines may be mobile (road) construction machines such as road pavers, road rollers, milling machines, graders, excavators, mobile working machines such as lifting platforms, cranes, garbage disposal vehicles, loaders, as well as agricultural or forestry harvesting and working machines, or the like. In this context, all known construction machines, working machines, as well as agricultural or forestry machines, are conceivable. For example, the vehicles may be rescue or emergency vehicles, or the like.

A further embodiment provides a system including a signal light as well as a pipe or frame or holder having a specified cross section.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
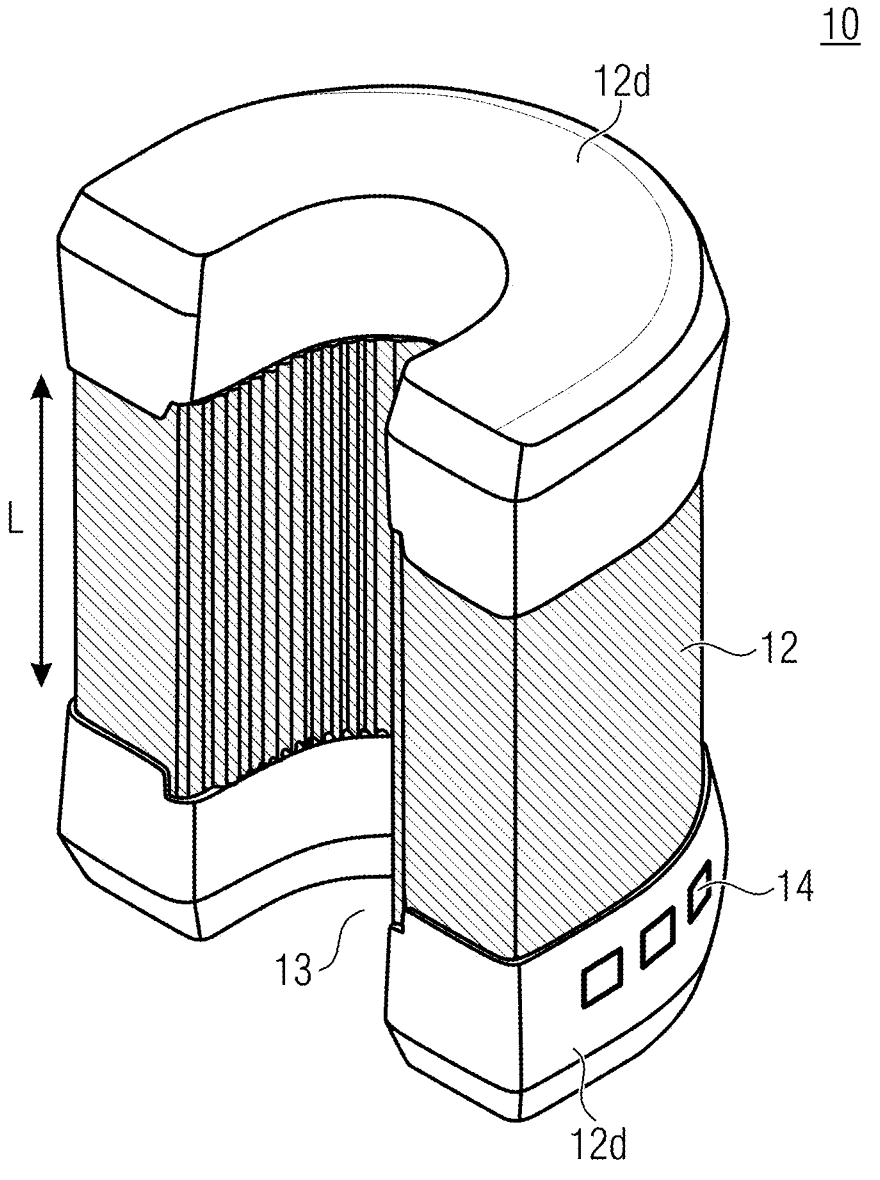
FIG. 1*a* shows a schematic illustration of the signal light according to an embodiment in a perspective illustration.

Before embodiments will be explained in the following with reference to the attached drawings, it should be pointed out that elements and structures having the same effect are provided with the same reference numerals, so that the description thereof can be applied to one another.

FIG. 1*a* shows the signal light 10 having a housing 12 and lighting elements 14 embedded in the housing. In the present case, these may be arranged behind one or more transparent regions provided with the reference numeral 12*d*.

In the present case, the housing 12 has a U-shape or C-shape. This means that the housing 12 forms this C-shape in two dimensions, while the housing 12 has an elongated shape in a third dimension (length dimension, cf. arrow L). Apart from the cutout caused by the C-shape, the housing 12 thus has a cylindrical shape with the cutout 13. The cutout 13 may have a round region with or without an undercut, as can be clearly seen with reference to FIG. 1*b*.

Figure 1B:
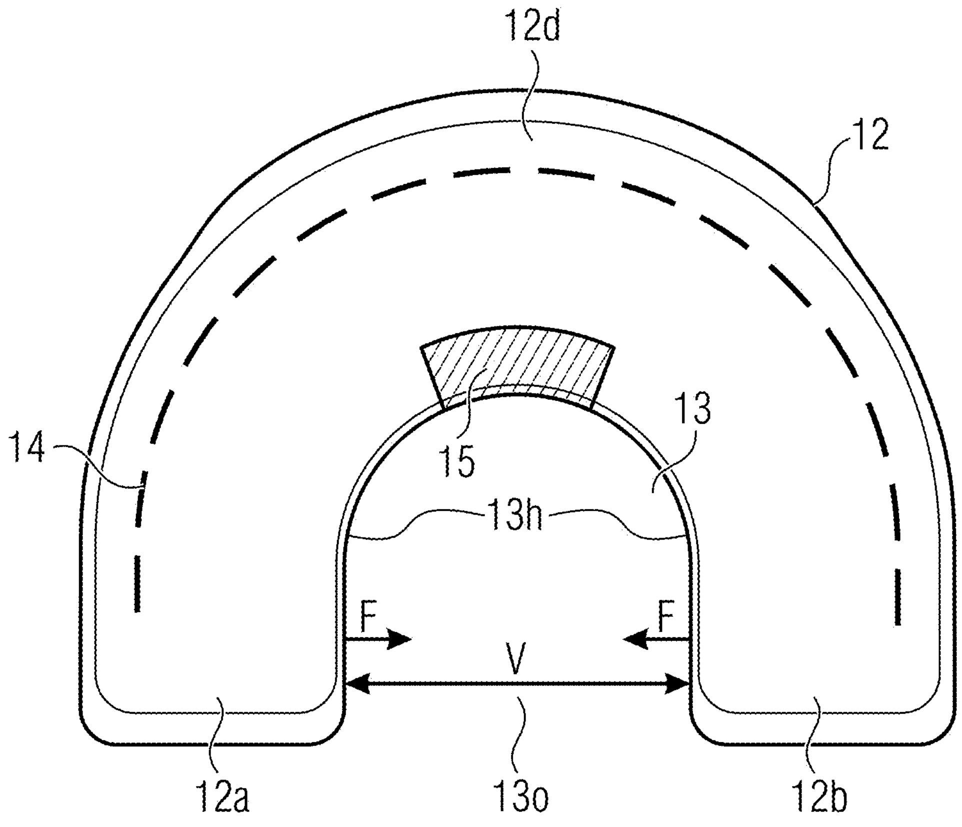
FIG. 1*b* shows a schematic illustration of the signal light from FIG. 1*a* in a top view to explain the clamping mechanism starting from the C-shape or U-shape, according to embodiments.

FIG. 1*b* shows a top view of the signal device 10. As can be seen, the housing 12 and the transparent region 12*d* of the housing 12 extend in a U-shape around the cutout 13. Alternatively, the housing may also have a C-shape so that undercuts are formed at the locations 13*h*. The cutout 13 can thus have an undercut 13 *h* according to further embodiments, wherein this undercut 13 *h* is optional. This means that, according to embodiments, the housing 12 may have a C-shape or, according to alternative embodiments, also a U-shape. The housing 12 has a flexible region in one region of the cutout 13 or also in a plurality of regions of the cutout 13, This flexible region is provided with reference numeral 15. Due to the flexible region 15, it is possible for the two housing halves 12*a* and 12*b* to be movable at least in a limited region. The movement or deformation region is provided with reference numeral V. In the case of deformation of the housing 12 due to the spreading of the housing halves 12*a* and 12*b* around the region 15, an elastic deformation of the region 15 occurs so that, in response to the deformation, the force F is then exerted radially by the two housing halves 12*a* and 12*b* or the two legs 12*a* and 12*b*. This makes it possible for a clamping force to be applied radially on an element located in the cutout 13, such as a pipe. This makes it possible to generate clamping with a positive and/or non-positive connection.

According to embodiments, the deformation may also be used to introduce a pipe through the opening 130 between the two housing halves 12*a* and 12*b* and to hold it in the undercut region.

Starting from the top view from FIG. 1*b*, a pipe (not illustrated) thus extends into or out of the plane of the illustration. This means that the housing 12 is configured to be clamped on an elongate object extending along the longitudinal axis L. Advantageously, the elongate object has a shape adapted to the cutout 13, for example a round shape. This means that the elongate object may also have another shape, such as an angular shape, wherein the cutout 13 then advantageously likewise has a correspondingly angular shape. This makes it possible for the signal lamp 10 to be clamped to a pipe, for example a vertical pipe of a construction machine, working machine, agricultural machine, or a vehicle, solely on account of the shape. The housing 12 and the transparent region 12*d* and also the lighting elements 14 then extend around the pipe in the cutout 13. At this point, it should be noted that the round shape of the cutout 13 may also have in the bent-open state (cf. elastic deformation region V), while in a non-deformed state the cutout 13 may have an oval shape, for example.

Starting from this, the lighting elements 14, such as RBG LEDs or RGBW LEDs, extend in a circular manner around the clamping object. This advantageously has the effect that detection of the illumination signal is thus possible in a large emission range, in this case over 180° or even over 270°. To drive the LEDs, the unit 10 may comprise a controller (not illustrated); the latter is used, e.g., to receive data bus signals, to decode the data bus signals, and for corresponding (individual) driving in the sense of converting the messages into color signals, text signals, or graphics signals. According to embodiments, the controller may differentiate between daytime and nighttime modes. Depending on this, it would be conceivable to control the brightness (or display in general) in order to optimize readability under all light conditions.

In this context, according to further embodiments, the signal light 10 may comprise a brightness sensor (not illustrated in the figures). This makes it possible to automatically adapt the brightness of the lighting elements 14, e.g. by the controller described above, to the ambient brightness and to improve the readability of the lighting elements 14. The power consumption of the signal light 10 may also be optimized by adapting the brightness of the lighting elements 14 to the ambient light conditions. Furthermore, the signal light 10 may comprise a temperature sensor (not illustrated in the figures), as a result of which the brightness of the lighting elements 14 may likewise be automatically adapted.

In the embodiment from FIGS. 1*a* and 1*b*, it was assumed that the transparent regions 12*d* are provided both at the lower and at the upper end of the cylinder, so that two lighting arrays with the lighting elements 14 are provided. This makes it possible to output the corresponding color signal both at the bottom and at the top or else to output different signals at the top and at the bottom. For example, only alarm signals (warning indications) with red may be signaled at the top and only ready signals (status indications) with green at the bottom. Obviously, a variation of the colors and also of the signal states is also possible. Alternatively, it is also conceivable for multicolor LEDs (RGB or RGBW LEDs, e.g. 100 RGB or RGBW LEDs) also to be used instead of single-color LEDs, so that a plurality of signal states may be signaled at the top or at the bottom via one and the same array. LEDs generally have the advantage of saving energy.

Figure 1C:
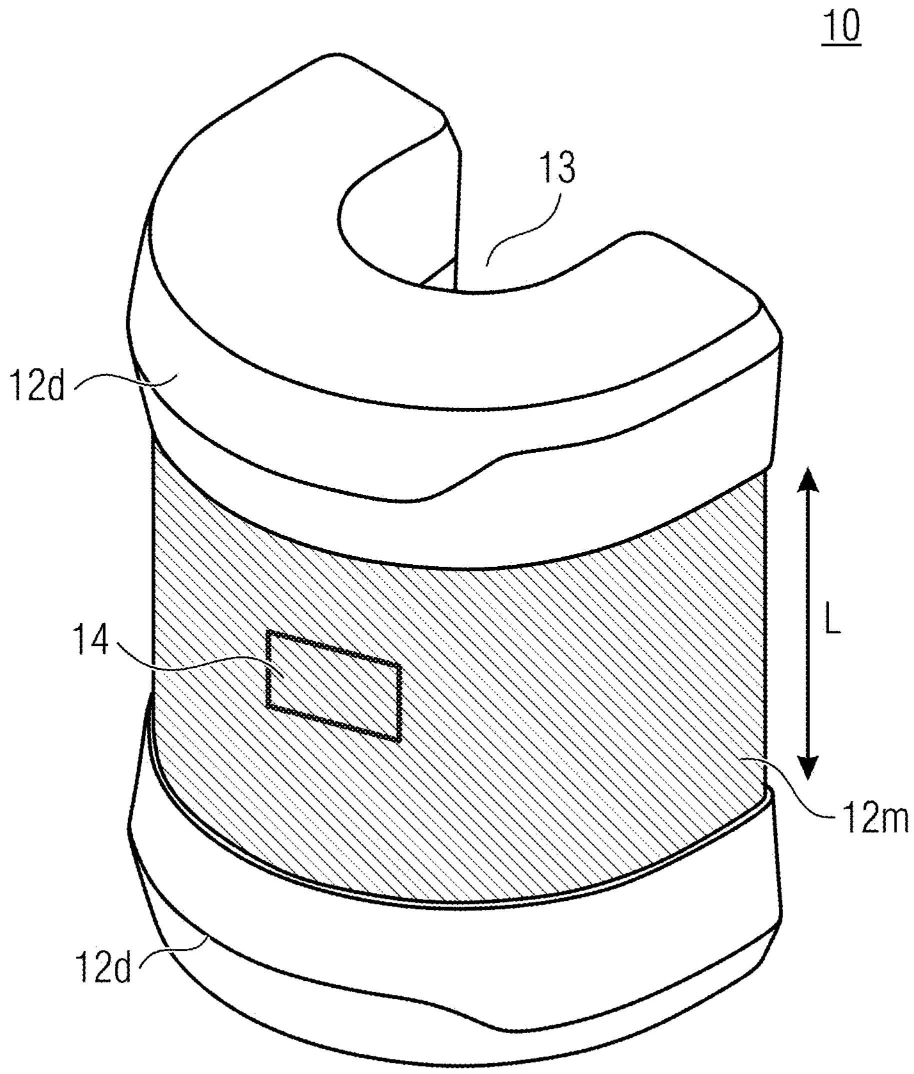
FIG. 1*c* shows a further schematic illustration of the signal light according to an embodiment in a further perspective illustration.

Alternatively or additionally, the cladding surface region 12*m* (see FIG. 1*c*) may also comprise one or more lighting elements or planar lighting elements 14, for example one or more single-color or multicolor LEDs (RGB or RGBW LEDs or LED arrays). For this purpose, the cladding surface region 12*m* is configured to be either completely transparent or at least partially transparent.

The different signal states are also possible via different flashing frequencies. Furthermore, it would also be conceivable for running lights to be conceivable in series by individually driving the plurality of lighting elements 14 in order to symbolize a waiting state, for example. Furthermore, lighting elements 14 may be used flexibly for fill levels, for example (individual driving). According to further embodiments, in addition to mere color signals, the unit 10 delivers specific messages tailored to the application context. Customers may use logos, images and texts and thus adapt the signal light to their requirements. The lighting elements 14 may thus be arranged as a type of matrix for displaying text or the like, advantageously in the central region of the signal device 10. For this purpose, this central region of the cylinder, i.e. the region between the lower and upper regions 12*d*, is likewise configured to be transparent.

According to further embodiments, it would also be conceivable for a plurality, i.e. more than the two arrays, to be provided as lighting elements.

As already explained above, the emission advantageously takes place in a large emission range (>120°, >150°, >180° or even >270°). A ring-shaped lighting array or also a C-shaped or U-shaped lighting array is formed by this emission range.

At this point, it should be noted that the signal light 10 may also comprise communication means, e.g. radio communication means, such as Bluetooth, WLAN or the like, e.g, in order to receive from the outside, e.g. from a construction machine/working machine/agricultural machine or from a vehicle, the corresponding information to be displayed by color coding or to be displayed in general with the status indication. Of course, according to embodiments, it is also conceivable for a cable connection to the construction machine/working machine/agricultural machine or the vehicle to be established. In this respect, the status indication 10 may comprise an interface, in particular a cable interface for receiving data. According to further embodiments, electrical energy for operating the signal light and/or for charging a battery of the signal light may also be available via such an interface or this interface. According to embodiments, the signal light may obviously also be battery-operated or comprise other energy supply means.

According to further embodiments, an inclination sensor or position sensor (not illustrated in the figures) may be arranged in or on the signal light 10 in order to determine the arrangement of the signal light on the construction machine/working machine/agricultural machine or the vehicle in a horizontal or vertical position. A change in position or orientation of the signal light 10 may also be detected with the inclination sensor or position sensor. If the signal light 10 comprises a matrix, as described above, for displaying logos, images or texts, it is possible, e.g. with a rotation of the signal light 10 by 90°, to automatically adapt the displayed content (e.g., an image or a text) to the new position/orientation.

Alternatively or in addition to the above-described clamping of the housing 12 by positive and/or non-positive connection, it is possible to fasten the signal light 10 to a construction machine/working machine/agricultural machine or to a vehicle by means of a screw connection. To this end, the housing 12 comprises corresponding means for fastening the signal light 10, e.g., in the region of the cutout 13 or the opening 130. The means for fastening may be threaded bores, threaded sleeves, threaded inserts, threaded bolts, or the like, for example. Further fastening options, alternatively or in addition to the already described clamping of the housing 12, e.g. via mechanical holders or brackets, are conceivable and possible. In this context, it is also conceivable to fasten the signal light 10 to the construction machine/working machine/agricultural machine or to the vehicle via a corresponding mechanical holder, by means of which the signal light 10 can be fastened to the machine/the vehicle simply and without further tools.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A signal light, in particular a signal light for a construction machine, working machine, agricultural machine, or a vehicle, comprising:

a housing;

at least one lighting element comprising a circumferential illumination array and being integrated into the housing and configured to visualize a state;

wherein the housing comprises a C-shape or U-shape defining a recess configured to receive a structural element and wherein the housing is configured to exert a radial clamping force on the structural element to retain the signal light;

wherein the circumferential illumination array extending over more than 180° around the structural element.

2. The signal light according to claim 1, wherein the housing is configured to be elastically deformed with respect to an opening cross section, defined by the ends of the C-shape or U-shape, due to a region-wise flexible property.

3. The signal light according to claim 1, wherein a semicircular opening cross section or a specified opening cross section is formed by the C-shape or U-shape.

4. The signal light according to claim 3, wherein the semicircular opening cross section or the specified opening cross section is configured to cause clamping with respect to a counterpart and/or to form a frictional connection or non-positive connection with the counterpart.

5. The signal light according to claim 3, wherein the semicircular opening cross section or the specified opening cross section is flexibly deformable.

6. The signal light according to claim 1, wherein the housing with the C-shape or U-shape in the first and second dimensions comprises an elongated shape in the third dimension and/or wherein the housing with the C-shape or U-shape comprises a cylindrical shape in a three-dimensional view.

7. The signal light according to claim 1, wherein the at least one integrated lighting element is configured to visualize various states with various colors and/or various display frequencies; and/or wherein the at least one lighting element comprises an emission angle greater than 120°, greater than 150°, greater than 180°, or greater than 210°.

8. The signal light according to claim 1, wherein the signal light comprises a data bus and/or data radio interface via which it may be coupled with a controller or a construction machine, working machine, agricultural machine, or vehicle and/or a component of the machine/the vehicle.

9. The signal light according to claim 1, wherein the signal light comprises an electrical energy supply, in particular a battery or rechargeable battery integrated in the signal light or arranged thereon.

10. The signal light according to claim 1, wherein the at least one integrated lighting element is configured as a running light or as a matrix for displaying texts, or images or the like.

11. The signal light according to claim 1, wherein a brightness sensor and/or a temperature sensor is arranged in or on the signal light.

12. The signal light according to claim 1, wherein an inclination sensor or position sensor is arranged in or on the signal light.

13. The signal light according to claim 1, wherein the signal light comprises an integrated buzzer.

14. A construction machine, working machine, agricultural machine, or vehicle comprising a signal light according to claim 1.

15. The construction machine, working machine, agricultural machine, or vehicle according to claim 14, wherein the construction machine, working machine, agricultural machine, or the vehicle comprises a pipe or a frame or a holder whose cross section substantially corresponds to the opening cross section.

16. The construction machine, working machine, agricultural machine, or vehicle according to claim 14, wherein the signal light is configured to display one or more states of the construction machine, working machine, agricultural machine, or the vehicle or the component of the construction machine, working machine, agricultural machine, or the vehicle.

17. The construction machine, working machine, agricultural machine, or vehicle according to claim 14, wherein the construction machine, working machine, agricultural machine, or the vehicle or the component of the construction machine, working machine, agricultural machine, or the vehicle or the controller of the construction machine, working machine, agricultural machine, or the vehicle is informatively coupled to the signal light.

18. A system comprising a signal light according to claim 1 as well as a pipe or frame or holder with a specified cross section.

* * * * *